(12) United States Patent
Matthys et al.

(10) Patent No.: US 7,339,625 B2
(45) Date of Patent: Mar. 4, 2008

(54) OPTICAL AND ELECTRICAL BLENDING OF DISPLAY IMAGES

(75) Inventors: Geert Matthys, Haaltert (BE); Bart Maximus, Oudenaarde (BE); Glenn Devos, Gistel (BE)

(73) Assignee: Barco N.V., Kortrijk (BE)

( * ) Notice: Subject to any disclaimer, the term of this patent is extended or adjusted under 35 U.S.C. 154(b) by 762 days.

(21) Appl. No.: 10/878,646

(22) Filed: Jun. 28, 2004

(65) Prior Publication Data

US 2005/0287449 A1    Dec. 29, 2005

(51) Int. Cl.
*H04N 9/12*    (2006.01)
(52) U.S. Cl. .................... 348/383; 348/744; 348/778; 348/785
(58) Field of Classification Search ............ 348/383, 348/38, 744–747, 778, 756, 781, 785, 189, 348/180, 840; 345/1.1, 1.3, 4, 19; *H04N 9/12*
See application file for complete search history.

(56) References Cited

U.S. PATENT DOCUMENTS

| | | | |
|---|---|---|---|
| 6,545,685 B1 * | 4/2003 | Dorbie ........................ 345/582 |
| 6,570,623 B1 | 5/2003 | Kai et al. |
| 6,753,923 B2 * | 6/2004 | Gyoten ........................ 348/383 |
| 6,760,075 B2 * | 7/2004 | Mayer et al. ................ 348/383 |
| 7,038,727 B2 * | 5/2006 | Majumder et al. .......... 348/383 |
| 7,193,654 B2 * | 3/2007 | Baker et al. ................. 348/383 |
| 7,224,411 B2 * | 5/2007 | Gibbon et al. .............. 348/757 |
| 2002/0057361 A1 | 5/2002 | Mayer et al. |

FOREIGN PATENT DOCUMENTS

| EP | 0 786 687 A1 | 7/1997 |
|---|---|---|
| WO | WO 02/05553 A2 | 1/2002 |

OTHER PUBLICATIONS

European Search Report, dated Oct. 5, 2005.

* cited by examiner

*Primary Examiner*—Trang U. Tran
(74) *Attorney, Agent, or Firm*—Trop, Pruner & Hu, P.C.

(57) ABSTRACT

A method and a device for soft edge blending of projected display images (16a, 16b) is provided. The method combines optical and electrical soft edge blending in an blending area (26) by using electrical blending in one fraction (146a, 146b) of the blending area (26a, 26b) of two or more overlapping images and using optical blending in another fraction (144a, 144b) of the blending area (26a, 26b). The method according to the present invention overcomes problems with manufacturing, alignment and adjustment of optical masks (148a, 148b) used in optical blending and the difficulties with electrically blending black images. The blending method can also be used in systems providing switching from soft edge blending to hard edge matching.

13 Claims, 7 Drawing Sheets

OPTICAL AND ELECTRICAL BLENDING OF DISPLAY IMAGES

TECHNICAL FIELD OF THE INVENTION

The present invention relates to a method for blending tiled images displayed by a projection display system. In particular it relates to a method for obtaining improved blending of tiled images displayed by a projection display system. The method provides both a good black level blending and a high flexibility.

BACKGROUND OF THE INVENTION

Figure 1:
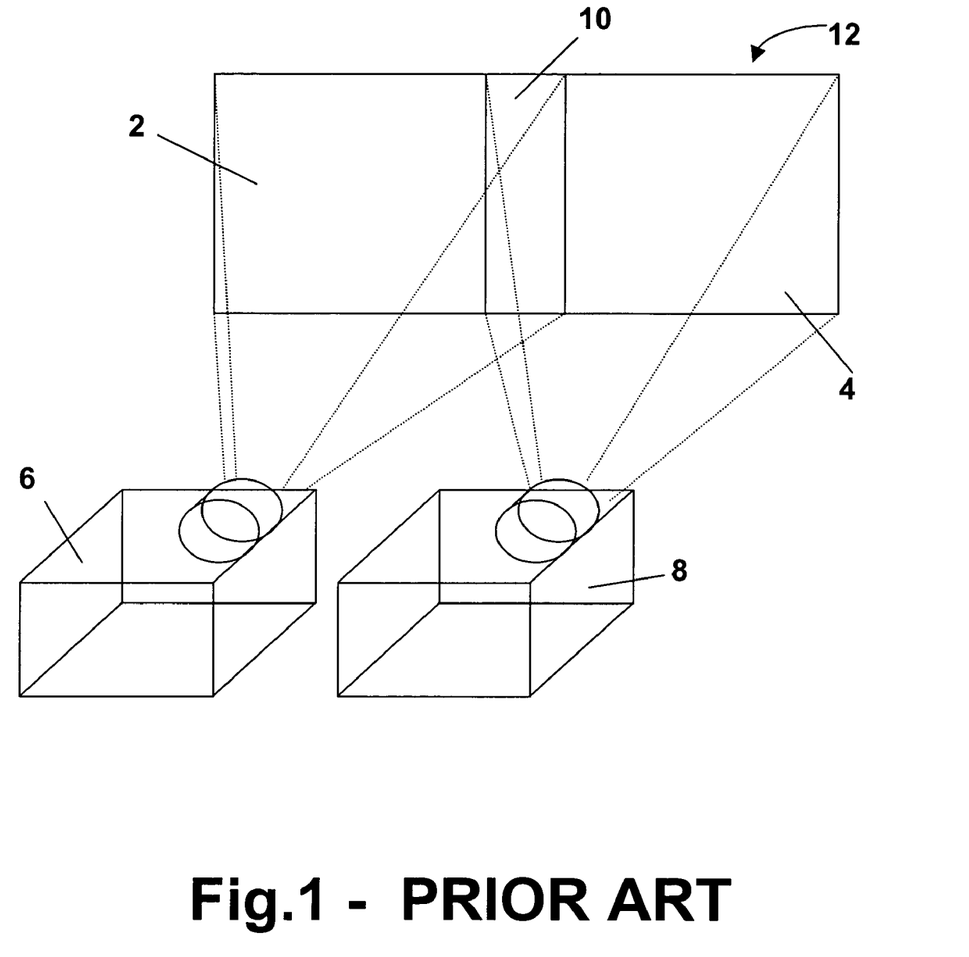
FIG. 1 illustrates the known principle of soft edge blending of two adjacent images projected onto a display screen by two adjacent projectors.

When tiling sub-images of a tiled image, hard edge or soft edge techniques can be applied.

Where hard edge techniques are applied, the projected sub-images are put next to each other. This is often not an optimal solution because the edges between the sub-images are difficult to arrange in perfect alignment and the join may well be noticeable.

Where soft edge techniques are applied, an overlap area is created in which two or more neighbouring sub-images, i.e. at least a first sub-image and second sub-image, are blended so that there is at least a gradual transition from the first sub-image to the second sub-image. Therefore the first sub-image is progressively spatially faded out whilst the second sub-image is progressively spatially faded in. The principle of soft edging is illustrated by means of FIG. 1. In FIG. 1, a first sub-image 2 and a second sub-image 4 are projected by means of a first projector 6 and a second projector 8, respectively, in such a way that an overlap area 10 is created in the image 12 formed by the first sub-image 2 and the second sub-image 4 on the screen, namely in the area which is illuminated by more than one projector, in the present case by the first projector 6 and the second projector 8. In case of a good soft edge, the first and second sub-images 2, 4 are processed, optically or electrically, in such a way that the sum of the light intensity in the overlap area 10 is equal to the average intensity outside the overlap area 10, and in such a way that the contribution of the first projector 6 to this total intensity in the image 12 changes gradually from maximum to zero from a first side of the overlap area 10 to a second side of the overlap area 10, while the contribution of the second projector 8 to this total intensity changes gradually from zero to maximum from the first side of the overlap area 10 to the second side of the overlap area 10.

Two types of soft edge techniques or blending techniques are known: electrical blending and optical blending.

The use of electrical edge blending is known in the industry and is widely used in cathode ray tubes (CRT), digital light processing displays (DLP™), liquid crystal displays (LCD) and other projection display technologies.

In U.S. Pat. No. 4,974,073 a seamless video display is generated from multiple discrete video images by overlapping the images and ramping the image brightness in the overlaps. The resulting composite image is of uniform brightness and has no seams between the images of which it is composed.

U.S. Pat. No. 5,136,390 describes a method and apparatus for establishing consistent image brightness, especially for a multiple video image seamless display. A set of smoothing factors is stored in a memory, one for each detail element of each image. The method comprises applying a predetermined set of smoothing factors to the brightness components of the detail elements of the two signals, projecting the images as modified by the smoothing factors onto a display, modifying selected smoothing factors in response to the appearance of the projected display, and finally, storing a representation of the smoothing factor modifications. This allows a seamless multiple video image display to appear more consistent and uniform in brightness than a conventional single video image display.

The advantages of electrical blending are known: real time control, dynamically changeable based upon imagery or changes in the system configuration, flexible attenuation curves of any type can easily and simply be defined.

However, in the case of modern light modulators such as DLP™ and LCD, maximum attenuation in the blend region of an electronic blending system does not produce an entirely black image due to light leakage inherent in the modulator technology. This means that black and near-black imagery cannot be successfully blended using only electronic means. This problem is known as "double black" or "non-zero black level problem": the combination of the two light leakages in the overlapping blend region will lead to a black level intensity that is twice the level of the black level intensity in non-overlapping areas. Such a region is easily detected when black or near-black images are displayed, as the eye is very sensitive to abrupt transitions in brightness as occurs in an uncompensated blend region.

It is known, for example from US-2002/0057361 to compensate for this effect by boosting the minimum black level of the video signal in non-overlapped areas without affecting the bright portion of the video signal in order to create uniform black level. Although this method can be used, it results in a loss in system contrast.

It is also known to use optical masks either with hard edges, dither patterns, or gradient patterns of some kind and by placing such devices either internally or externally to the projectors to cause smooth transitions in blend regions to produce a satisfactory blend. Such systems are described for example in WO 95/25292 and WO 01/41455.

Optical blending systems do not suffer from the "double black" problem and offer an acceptable blend at all brightness levels from white to black. Nevertheless, the designing, manufacturing and alignment of the optical masks in a projector system needs to be done very carefully, and consequently is time consuming and expensive. Furthermore, modifications to the blending shape are difficult and time consuming and due to their inherently fixed nature, changes to the blend regions for the purposes of changes in display configuration are not possible without articulated mechanical systems. The advantage of an optical blending system is that it does not suffer from the "double black" problem and can therefore produce an acceptable blend at all brightness levels from white to black when property designed and installed.

U.S. Pat. No. 6,570,623 describes the use of a blending frame to control the degree of intensity reduction in the overlapping region of two adjacent images projected by two different projectors in a video wall system. It furthermore comprises the use of digital compensation to fine-tune the optical blending results by digitally altering the image source using a camera-based feedback loop. Nevertheless, the blending method described in U.S. Pat. No. 6,570,623 still suffers from the problems inherent to optical blending, e.g. difficulties with design, manufacture and alignment of optical masks and difficulties to maintain and reconfigure the system without the need of mechanical articulation devices.

SUMMARY OF THE INVENTION

It is an object of the present invention to overcome the above mentioned problems in order to obtain a system and a method providing a high quality resulting image combined with a facilitated installation, alignment and maintenance of the system.

The above objective is accomplished by a method and device according to the present invention.

The current invention describes a blending method for the blending of at least a first and a second adjacent image. The first and the second image overlap in an overlap area. The first and the second image are blended in a blending area. The overlap area and the blending area may be the same, or alternatively the blending area may be smaller than the overlap area. In this case, parts of the images falling in the overlap area but outside the blending area, are completely blanked out by optical soft edge techniques. According to the present invention, optical and electrical soft edge blending techniques are used in different fractions of the blending area. Over a first fraction of the blending area, the light intensity of the first image is reduced by electrical soft edge means, i.e. generating an electronically driven intensity attenuation, while over a second fraction of the blending area, the light intensity of the first image is reduced by optical soft edge means, i.e. generating a hardware driven or optical component driven intensity attenuation. The light intensity of the first image is in this way reduced over the blending area from its full intensity value at the edge of the blending area with the first image to zero at the edge of the blending area with the second image. In a similar way, the light intensity value of the second image is changed by electrical and optical soft edge means over the second fraction and the first fraction respectively. The light intensity of the second image is in this way increased over the blending area from zero at the edge of the blending area with the first image to its full intensity value at the edge of the blending area with the second image. The above mentioned first fraction and second fraction differ from each other, i.e. they are not located at exactly the same part of the blending area, while combining the two fractions results in the whole blending area of the two blended images. Quality of the optical soft edge means, such as transmission curve, shape and lifetime, and accuracy of electrical soft edge means are limitations on each of the blending methods to obtain a result which combines the best of both blending methods.

In a first aspect, the present invention provides a method for blending at least a first image with a first light intensity having a first intensity value and a second image with a second light intensity having a second intensity value, which first and second images overlap in a blending area. The method comprises gradually changing the first light intensity by electronic soft edge means over a first fraction of the blending area, from the first intensity value to a first fraction of the first intensity value, and gradually changing the first light intensity by optical soft edge means over a second fraction of the blending area, from the first fraction of the first intensity value to a second fraction of the first intensity value, whereby the first fraction of the blending area are spatially different from the second fraction of the blending area and the first fraction together with the second fraction form the blending area, and gradually changing the second light intensity by optical soft edge means over a third fraction of the blending area, from a first fraction of the second intensity value to a second fraction of the second intensity value, and gradually changing the second light intensity by electronic soft edge means over a fourth fraction of the blending area, from the second fraction of the second intensity value to the second intensity value, whereby the third fraction of the blending area are spatially different from the fourth fraction of the blending area and the third fraction together with the fourth fraction form the blending area.

In a method for blending according to the present invention, said first fraction of the blending area and said second fraction of the blending area may be spatially situated in the blending area so that they have no common part.

The second fraction of the blending area may be located adjacent to an edge of said first image and the first fraction of the blending area may be located adjacent to an edge of said second image.

At least one of the first and second fraction of the blending area may comprise two or more non-adjacent regions.

In case the first and second images are provided by projection devices, the method may furthermore comprise making additional corrections for errors in positioning of the projection devices, for errors in positioning of the optical soft edge means and/or for errors in optical soft edge means manufacture.

The first fraction of the blending area may equal the third fraction and the second fraction may equal the fourth fraction.

The first, second, third and fourth fractions of the blending area each may have a width between 1% and 99% of the width of the blending area, preferably between 20% and 80% of the width of the blending area, still more preferred between 40% and 60% of the width of the blending area.

In a second aspect, the present invention provides a projection device for providing roll-off of light intensity of an image in an edge area, the image initially having a first light intensity having a first intensity value. The projection device comprises electronic soft edge means for gradually changing the first light intensity over a first fraction of the edge area, from the first intensity value to a first fraction of the first intensity value, and optical soft edge means for gradually changing the first light intensity over a second fraction of the edge area, from the first fraction of the first intensity value to a second fraction of the first intensity value, the electronic soft edge means and the optical soft edge means being such that the first fraction of the edge area is spatially different from the second fraction of the edge area and that the first fraction together with the second fraction form the edge area.

Said first fraction of the edge area and said second fraction of the edge area may be spatially situated in the edge area so that they have no common part.

The second fraction of the edge area may be located adjacent to an edge of said image.

At least one of the first and second fraction of the edge area may comprise two or more non-adjacent regions.

A projection device according to the present invention may furthermore comprise adjustment means for making additional corrections for errors in positioning of the projection device, for errors in positioning of the optical soft edge means and/or for errors in optical soft edge means manufacture.

The first and second fractions of the edge area each may have a width between 1% and 99% of the width of the edge area, preferably between 20% and 80% of the width of the edge area, still more preferred between 40% and 60% of the width of the edge area.

Other features and advantages of the present invention will become better understood through a consideration of the following detailed description, taken in conjunction with the accompanying drawings, which illustrate, by way of example, the principles of the invention. The description is given for the sake of example only, without limiting the scope of the invention. The reference figures quoted below refer to the attached drawings.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In the present invention optical blending or attenuation, electrical blending or attenuation and possibly a combination of optical and electrical attenuation is applied for blending two or more adjacent sub-images projected by two or more adjacent projection devices. These projection devices may be part of a projection display system that may be based on digital light processing (DLP™), liquid crystal display (LCD) or any other suitable projection display technology. Projection may be carried out on any suitable kinds of screens, such as for example front projection or back projection screens, having any suitable shape, such as for example curved or straight.

Figure 2:
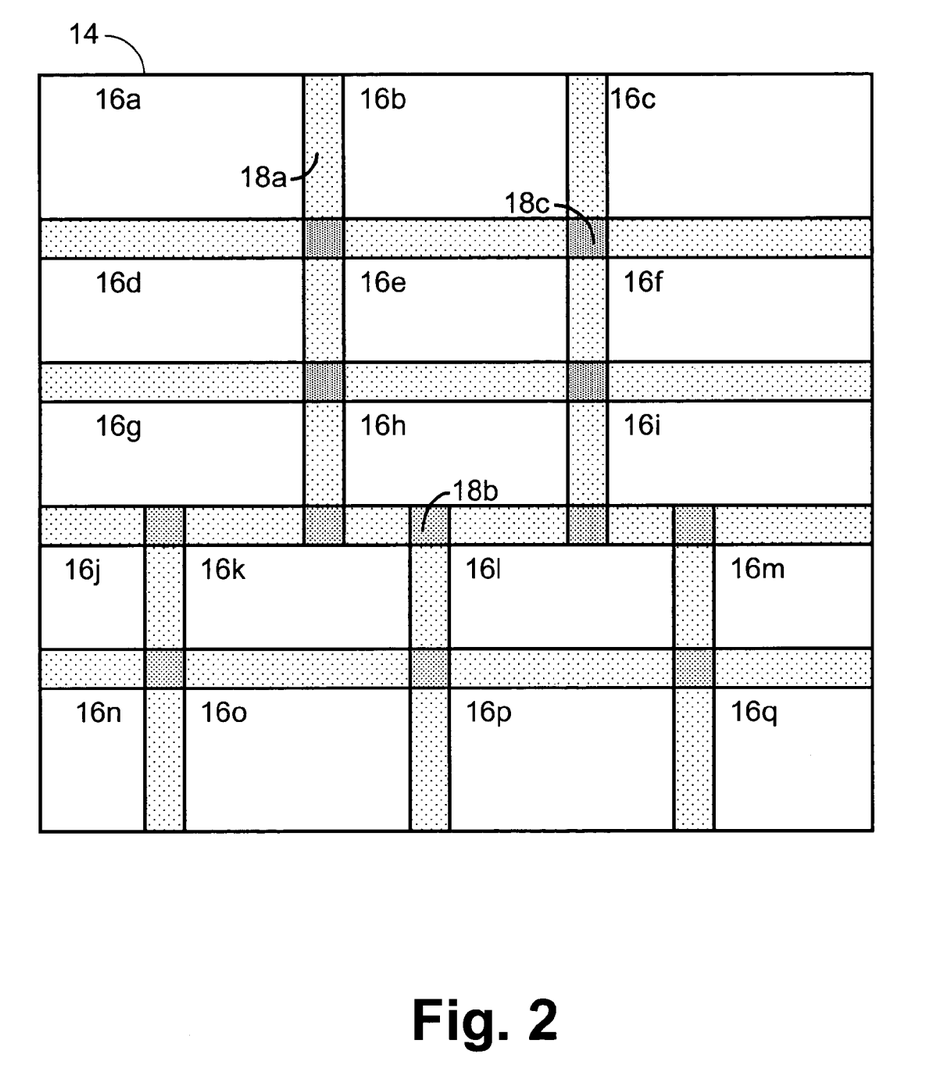
FIG. 2 illustrates blending areas in a projected image comprising a large number of sub-images.

FIG. 2 shows an image 14 projected onto a display surface such as a display screen by means of a plurality of projection devices (not represented in the drawing). The image 14 comprises a large number of sub-images 16a, 16b, 16c, 16d, . . . 16p, 16q and a number of blending areas 18a, . . . , 18c, i.e. areas on the display screen that are illuminated by more than one projection device. The blending areas 18 consist of the overlap, or a portion of the overlap, of at least two sub-images. In the example represented in FIG. 2, these blending areas 18 can consist of the overlap, or a portion of the overlap, of two sub-images 16, e.g. blending area 18a which is the overlap area of sub-images 16a and 16b; the overlap, or a portion of the overlap, of three sub-images 16, e.g. blending area 18b which is the overlap area of sub-images 16h, 16k and 16l; or the overlap or a portion of the overlap of four sub-images 16, e.g. blending area 18c which is the overlap of sub-images 16b, 16c, 16e and 16f. For clarity reasons, the blending method will be explained for the blending of two sub-images 16 projected by two adjacent projection devices, but the method of the present invention also includes blending in blending areas of three or more sub-images 16. Neither the total number of sub-images 16 in the projected image 14, nor the size of the projected image 14, nor the arrangement or the size of the different sub-images 16 is limiting for the blending method according to the present invention.

Figure 3:
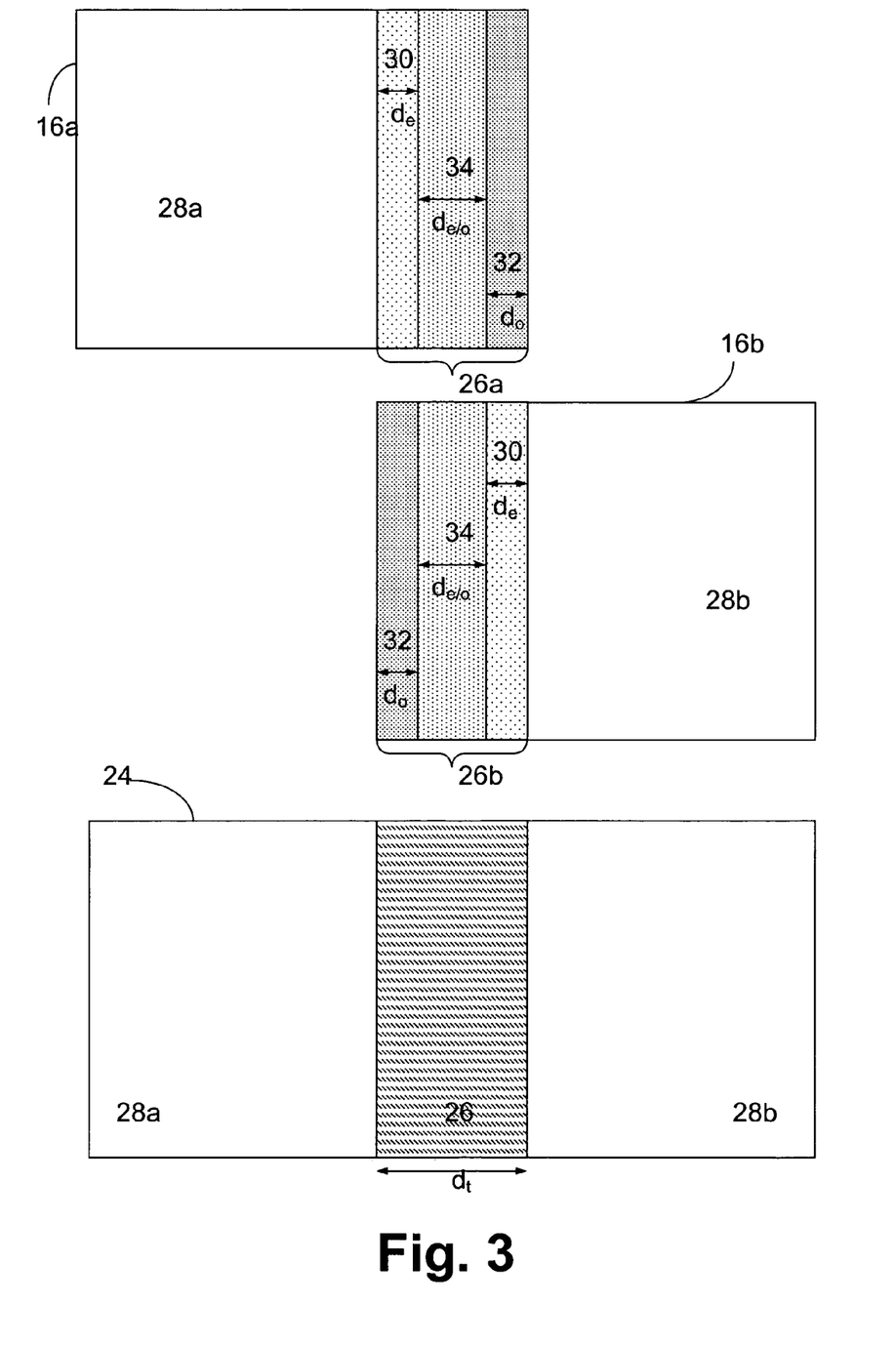
FIG. 3 illustrates blending of two adjacent sub-images according to a first embodiment of the present invention.

FIG. 3 illustrates the blending of a first sub-image 16a according to a first embodiment of the present invention, the blending of a second sub-image 16b according to the first embodiment of the present invention and the blended image 24 comprising both first sub-image 16a and second sub-image 16b. The blending area 26 is shown on the blended image 24. The corresponding parts 26a, 26b of the blending area on the sub-images 16a and 16b, respectively, are also shown. The non-overlapping areas 28a, 28b of the first and second sub-images 16a, 16b respectively, i.e. these areas that are not illuminated by more than one projection device and thus are not involved in the blending of the images, are also shown in FIG. 3. It is to be noted that the overlap area can be larger than the blending area, i.e. the area which is illuminated by two or more projectors may be larger than the area on which images are blended. In the embodiment illustrated in FIG. 3 the overlap area and the blending area have the same dimension.

According to the first embodiment of the present invention, for every sub-image 16a, 16b, the blending area 26a, 26b can be divided into three different spatial regions. A first of those spatial regions is first region 30, which is located in the blending area 26a, 26b of the first sub-image 16a, 16b adjacent to the non-overlapping area 28a, 28b of the respective sub-image 16a, 16b. The light intensity in the first region 30 is attenuated using only electrical attenuation, which is an electronically driven intensity attenuation.

First region 30 has a width $d_e$. In the current description, this type of attenuation will be referred to as active electrical attenuation. A second of the spatial regions is second region 32, which is located at the edge of sub-image 16a, 16b, i.e. at the part of the blending area 26a, 26b of the sub-image 16a, 16b which is located away from the non-overlapping area 28a, 28b. In the second region 32, the light intensity is attenuated using optical attenuation. Second region 32 has a width $d_o$. The electrical attenuation has a constant value in the second region 32, and the optical attenuation changes in that region. In this second region 32, the maximum light intensity is thus limited to a fixed fraction due to electrical attenuation, while the optical attenuation leads to an effective change of the light intensity in the area, i.e. the light intensity is increased or reduced in this area due to optical blending. In the current description, this type of attenuation will be referred to as active optical attenuation. According to the first embodiment, a third region 34 is also provided, where both electrical attenuation and optical attenuation are actively changing the light intensity. The third region 34 has a width $d_{e/o}$. In this third region 34, electrical attenuation and optical attenuation both lead to an increase or a reduction of the light intensity, i.e. they both do not limit the light intensity to a fixed fraction but have a gradient in their attenuation function over the area. This type of attenuation will be referred to as combined active optical and active electrical attenuation.

Electrical blending can be performed using for example the method described in WO 99/29116, which describes how an overall uniform intensity is obtained in the blending area 26 by multiplying the signals in the blending areas 26a, 26b with gain factors, which gradually drop from 1 to zero for each sub-image 16a, 16b as the blending area 26a, 26b is run through from the non-overlapping side to the edge of the sub-image 16a, 16b. The electrical attenuation may be the result of external or internal electrical methods, or it could also be part of the source material in a real-time or pre-calculated form. Electrical attenuation can be performed using any electrical blending technique available, as will be appreciated by a skilled person.

Optical blending may be the result of optical masks located internal or external to the projection device. It could be the result of blending plates that include hard edge masks, dithering patterns, continuous gradients, teeth, sawteeth or any other pattern or light shaping method. Some examples of these patterns are described in WO 01/41455, where a soft edge plate comprises a transparent area, an opaque area and a semi-transparent area. The semi-transparent area comprises an alternating macroscopic pattern of discrete opaque and transparent areas. Any other pattern than the ones described can also be used, as will be appreciated by a skilled person. The material of the soft edge plates may be chosen so that the reflectivity is as low as possible, in case multiple reflections with the light valves, ghost images, and photoconductivity problems in the case of LCD projectors are a problem. By preference, the soft edge plates are constructed on glass plates with an anti-reflective coating. Any transparent plastics material with a low double diffraction such as Plexiglass™ could also be used. The material applied on the opaque area and the opaque parts of the pattern, is required to have a good resistivity to heat dissipation. Preferably metal is used, which may be fully reflecting metal, absorbing metal or an intermediate form (partially reflecting and partially absorbing the light falling onto it). Absorbing metal will heat, thus causing stresses on the soft edge plate, while reflecting metal will heat much less. Normally the reflected light does not cause interference with the incoming light in the light path. Instead of metal also inks or varnishes, such as stove varnish, with a good heat resistance and heat dissipation can be used.

The widths $d_e$, $d_o$ and $d_{e/o}$ of the first, second and third spatial regions 30, 32, 34 are expressed in percentages of the total width $d_t$ of the blending area 26. Consequently, the different spatial regions 30, 32, 34 in the blending area 26 should be such that they satisfy the following equation $$d_e + d_{e/o} + d_o = 100\% \quad [1]$$

The width $d_e$ of the first region 30 where only active electrical attenuation is applied can be between 1% and 99%, preferably between 20% and 80%, more preferably between 40% and 60%. In order to avoid large "double black" problems, the situation wherein only electrical attenuation is used, i.e. $d_e = 100\%$, which is known from the prior art, is excluded. In a similar way, the situation where $d_e$ equals 0% is excluded as this is the case of only optical attenuation. Although this situation, known from prior art, solves the "double black" problem, it leads to several disadvantages based on the difficulty design and installation of optical masks, as already discussed above.

The width $d_o$ of the second region 32 where active optical attenuation is applied in combination with an electrical attenuation selecting a fixed fraction of the light output, can be between 1% and 99%, preferably between 20% and 80%, more preferably between 40% and 60%. The situation where $d_o$ equals 0% or $d_o$ equals 100%, i.e. when the blending is only based on only optical attenuation or only electrical attenuation is excluded.

The width $d_{e/o}$ of the third region 34 where combined active optical and active electrical attenuation occurs is such that equation [1] is fulfilled.

From the above description and the above definitions it should be clear that the width of the total region where optical soft edge means are used actively, i.e. for increasing or decreasing the light intensity, can be described as $$d_{optic\ soft\ edge\ means} = d_o + d_{e/o} \quad [2]$$

and the width of the total region where electrical soft edge means are used actively, i.e. for increasing or decreasing the light intensity, can be described as $$d_{elec\ soft\ edge\ means} = d_e + d_{e/o} \quad [3]$$

so that the $d_{optic\ soft\ edge\ means}$ and $d_{elec\ soft\ edge\ means}$ both are fractions of the blending area, which spatially differ from each other, and the combination of which covers the whole blending area 26.

Figure 4A:
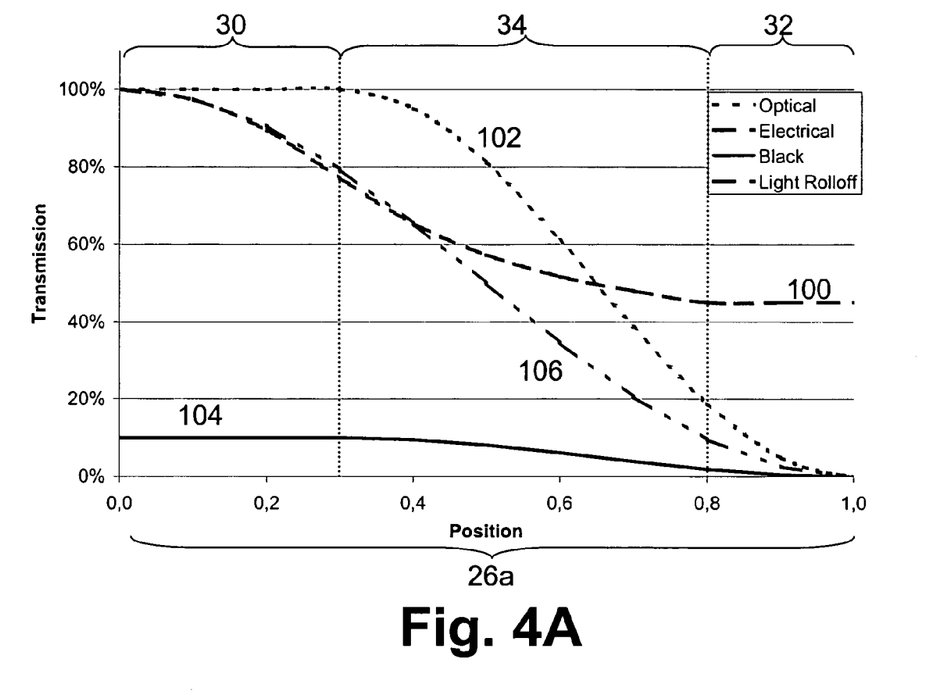
FIG. 4A shows an example of a graph of an optical attenuation curve, an electrical attenuation curve, a remaining black level intensity curve upon attenuation and a light roll-off upon attenuation curve versus the position in the blending area for a single sub-image according to the first embodiment of the invention.

FIG. 4A shows an example of an optical attenuation function and an electrical attenuation function as a function of the position in the blending area 26a. In this graph a curve of the electrical attenuation ($T_{elec}$) 100 of the light output as a function of the position in the blending area 26a, i.e. the transmission properties of the electrical attenuation filter, and a curve of the optical attenuation ($T_{opt}$) 102 of the light output as a function of the position in the blending area 26a, i.e. the transmission properties of the optical attenuation filter, are shown for a sub-image 16a. The position scale used, shows the position in the blending area 26a normalised to the range 0 to 1. The attenuation functions are expressed in percentages, 100% being the light intensity if a white level is displayed. In this example, given as illustration of the first embodiment, the active region of the electrical soft edge means has a width $d_{elec\ soft\ edge\ means}$ of 80%, extending from the edge of the non-overlapping region 28a in sub-image 16a to 80% of the blending area 26a, i.e. from x=0 to x=0.8 in the blending area 26a. In the remaining 20% of the blending area 26a the electrical soft edge means attenuate the light intensity to a fixed fraction of the light intensity, in the example illustrated about 45%. The active region of the optical soft edge means has a width $d_{opt\ soft\ edge\ means}$ of 70%, extending from about 30% in the blending area 26a to the edge of the sub-image 16a, i.e. from x=0.3 to x=1 in the blending area 26a.

FIG. 4A also shows the curve of the remaining black level 104 upon application of both the electrical blending and the optical blending in the respective regions of the blending area 26a. In the first region 30 of the blending area 26a, where only active electrical blending is performed, the black level is a fixed amount of light intensity, i.e. a fixed small amount of light output with non-zero intensity caused by leakage. For clarity, the leakage has been greatly exaggerated. Here it is represented at a 10% light intensity level. Normal levels may be up to about 1000 times less. In the second region 32 of the blending area 26a where optical attenuation is used, the black level of the sub-image 16a can become really zero, i.e. due to the optical blending light can be completely blocked leading to no remaining light output.

FIG. 4A also shows, as a function of the position in the blending area 26a, the effective light output for one sub-image 16a, as influenced by both optical and electrical soft edge means according to the first embodiment of the present invention. This is also called the light roll-off curve 106 and can be calculated as $$F(x)=T_{opt}\cdot((I_{white\ level}-I_{black\ level})\cdot T_{elec}+I_{black\ level}) \quad [4]$$

wherein $I_{white\ level}$ is the light intensity of full white in non-overlapping areas 28a, 28b and $I_{black\ level}$ is the light intensity in non-overlapping areas 28a, 28b if black is displayed, $T_{opt}$ is the light intensity attenuation due to attenuation of optical soft edge blending means and $T_{elec}$ is the light intensity attenuation due to electrical soft edge blending means in a single sub-image 16a.

For optimum blending, the light intensity should be such that there is a constant intensity over the whole blending area 26 of the overlapping sub-images 16a, 16b. This can be obtained if a first light roll-off curve $F_1(x)$ for a first sub-image 16a of a first projection device and a second light roll-off curve $F_2(x)$ for a second sub-image 16b of a second projection device fulfil the following equation $$F_2(x)+F_1(x)=1 \quad [5]$$

As the light roll-off curves for the different overlapping sub-images are expressed in percentages relative to the light intensity of their different projection devices, the above equation can be used for two balanced projection devices, i.e. projection devices which are calibrated to have the same light intensity, as well as for unbalanced projection devices. Consequently, although the use of balanced projection devices is beneficial for the overall image quality, the blending method according to the present invention is not restricted to adjacent projection devices that are balanced. The absolute light intensity for a displayed white level in a first projection device projecting a first sub-image may be different from the absolute light intensity for a displayed white level in a second projection device projecting a second sub-image adjacent the first sub-image. The blending method according to the present invention allows a gradual transition from the absolute light intensity in said first projection device to the absolute light intensity in said second projection device, leading to an optimised reduction of the detectability of light intensity differences due to unbalanced projection devices. Above equation [5] is also valid for the primary colours, as well as for all combinations of those primary colours.

Figure 4B:
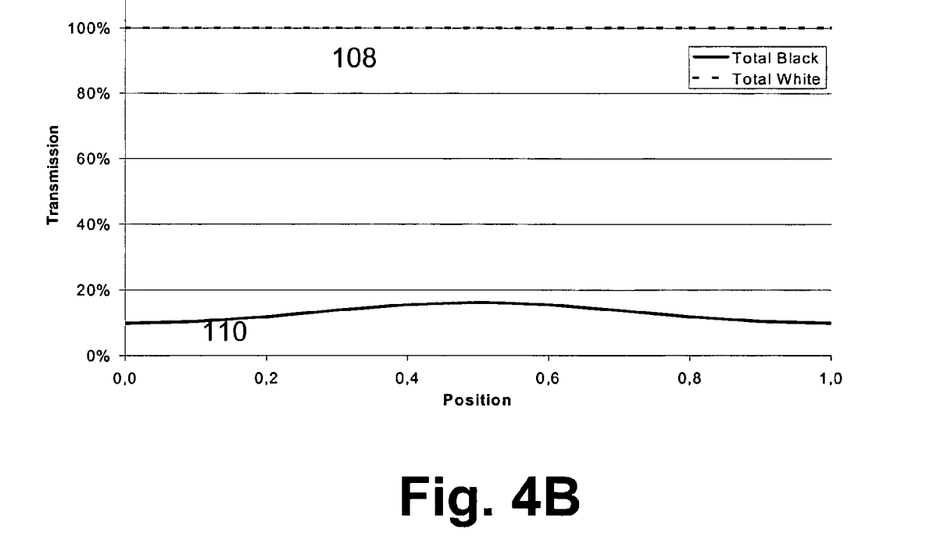
FIG. 4B shows an example of a graph of the total black level intensity and the total white level intensity in the blending area of two blended sub-images versus the position in the blending area of two blended sub-images, using the optical and electrical attenuation curves as shown in FIG. 4A, according to the first embodiment of the invention.

FIG. 4B shows the result of the actual total light output and the actual total black level for the blending of two adjacent sub-images 16a, 16b, if optical blending and electrical blending as the curves 100 and 102 shown in FIG. 4A are used to blend two sub-images 16a, 16b. The total white light output level curve 108 in the blending area 26, i.e. the sum of the remaining white level curve 106 after attenuation of the light intensity of the first sub-image 16a and the remaining white level curve 106 after attenuation of the light intensity of the adjacent sub-image 16, is shown in FIG. 4B. This curve 108 is also determined by equation [5]. It can be seen that the optimum blending condition is reached for the total light intensity in the blending area 26 of the blended image 24, as the total light intensity in the blending area 26 is the same as the total light intensity in the non-overlapping areas 28a, 28b, i.e. constant 100%. Furthermore, the total black level curve 110 in the blending area 26, i.e. the sum of the remaining black level intensity 104 after blending the first sub-image 16a and the remaining black level intensity after blending the adjacent sub-image 16b, is also shown.

It can be seen that, in contrast to black level curves for images that are only electrically blended, the black level curve in the blending region of the current invention does not include steps, i.e. it is a continuous smooth curve. Although the "double black" problem is not completely eliminated, it is minimised in size, as its slope is a smooth extended curve thereby reducing its detectability. Furthermore, the contrast ratio can be preserved in the non-overlapping areas 28a, 28b of the display. As the human eye is far less sensitive to gradual transitions of brightness intensity than it is to steep transitions of brightness intensity, e.g. steps, this strongly improves the visual blending quality for black or near-black images.

Furthermore, depending on the width of the region in which optical attenuation is active, the black level light intensity in the blended image 24 can be smaller than twice the black level light intensity of non-overlapping areas 28a, 28b, i.e. smaller than $2\times I_{black\ level}$, as can be seen in the graph of FIG. 4B. The maximum total black level light intensity depends on the width of the region in which optical attenuation is performed and on the amount of optical attenuation that is performed. In the above example, a maximum total black level of 1.6 times the black level light intensity $I_{black\ level}$ of non-overlapping areas 28a, 28b is obtained. The maximum total black level light intensity varies from $I_{black\ level}$, i.e. in the case, known from prior art in which the attenuation is performed completely by optical attenuation, to $2\times I_{black\ level}$ or less.

The "double black" problem can thus be reduced in at least one of two ways: by selecting proper optical and electrical soft edge means, the maximum amplitude can be reduced from double to an arbitrarily small value, and the shape of transitions into and out of the double black region can be adjusted to reduce their delectability. Depending on the demands put on the display system regarding contrast properties, the blending can be tailored so that it becomes interesting—in case of a limited double black amplitude—to compensate non-overlapping regions for the increased total black level light intensity, i.e. without abandoning too much in quality regarding the contrast of the display.

The attenuation curves and the widths of the different regions in which active electrical attenuation, active optical attenuation or combined active electrical attenuation and active optical attenuation occurs in the above example for the current embodiment are only illustrative and are not intended to be limiting for the present invention. The shape of the optical and electrical attenuation curves may strongly vary. Both combinations of linear functions as well as any other curved functions limited between zero and 100% can be used. Curved blending solutions have the additional benefit of being much less sensitive to small errors in alignment or drift following alignment.

The use of optical and electrical attenuation in not-identical, i.e. differing, spatial regions of the blending area has several advantages. This will become more clear from the description of other embodiments.

A second embodiment describes a blending method according to the present invention, whereby the extent of the area where optical blending is active is limited. Such systems have an optical attenuation of each single projection device, that is only active on the image in a second half or less of the blending area 26a. This can be expressed by the equation $$d_{e/o} + d_o \leq 50\% \quad [6]$$

Systems, where the optical blending satisfies this equation, have the major advantage that they can be switched from blended mode to non-blended mode using only electrical control of the images without applying mechanical articulation of optical masks.

By using optical blending only in the second half or less of the blending areas 26a, 26b, it is possible to change the electrical attenuation function from a ramp to a step function with a transmission of 100% in the first half of the blending area 26a, 26b and 0% in the second half of the blending area 26a, 26b. Two sub-images 16a, 16b edge blended using this new electrical blending function will now appear to be edge matched (non-overlapping). By proper scaling of the input video, the images can appear to be fully edge matched with no loss of imagery with the benefit that no mechanical articulation was required to (re)move the optical bend plates. The electrical and optical attenuation curves may either be consisting of linear functions or being curved. As the transition from soft edge blending to hard edge matching can be performed by only changing the electrical attenuation function, this avoids the need to apply expensive and fragile mechanical features to flap the optical soft edge means in systems that can be switched between hard edge and soft edge blending.

Figure 5A:
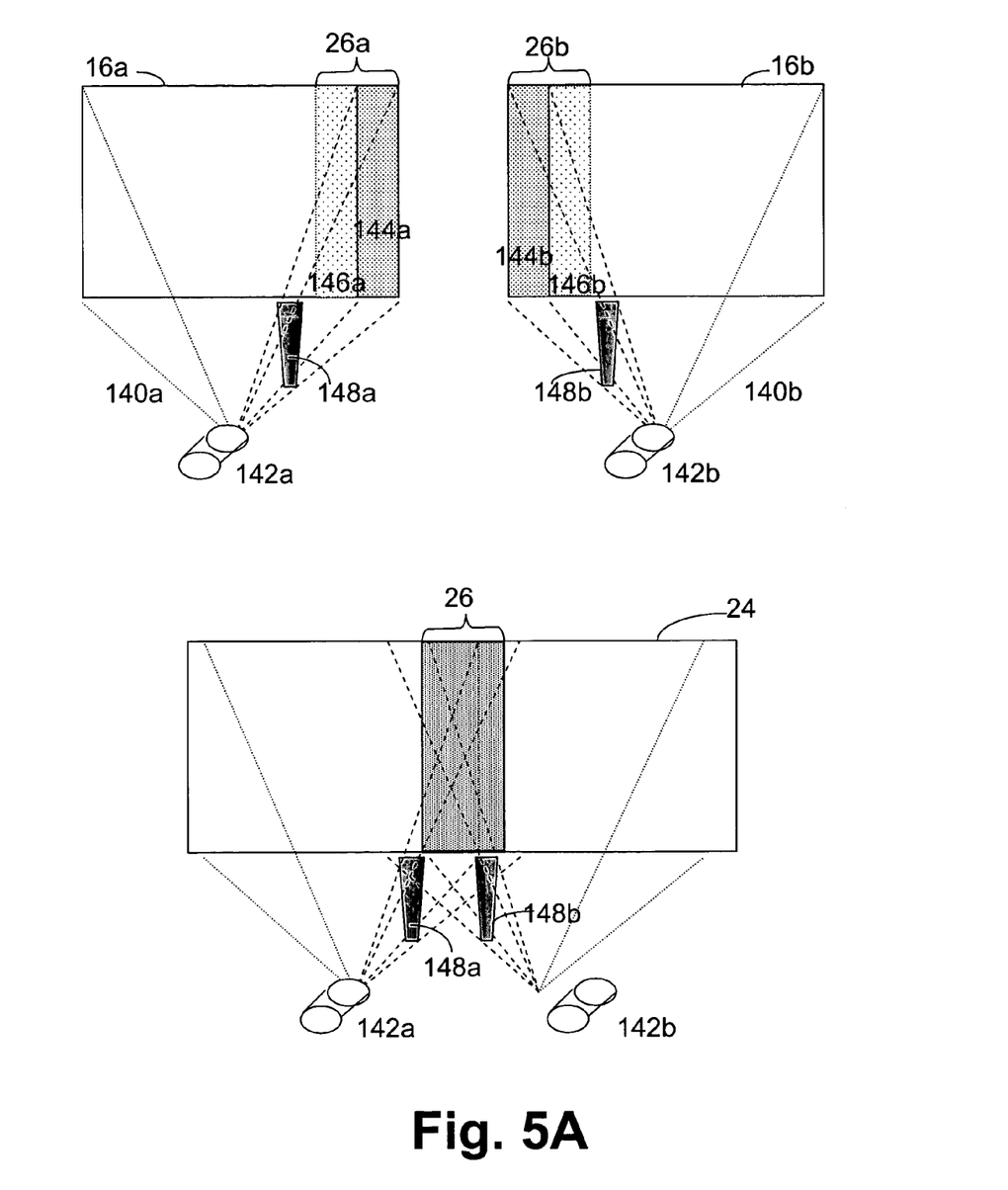
FIG. 5A is a schematic representation of the projection of two sub-images and the blending of the two sub-images in a soft-edge mode according to a second embodiment of the current invention.
Figure 5B:
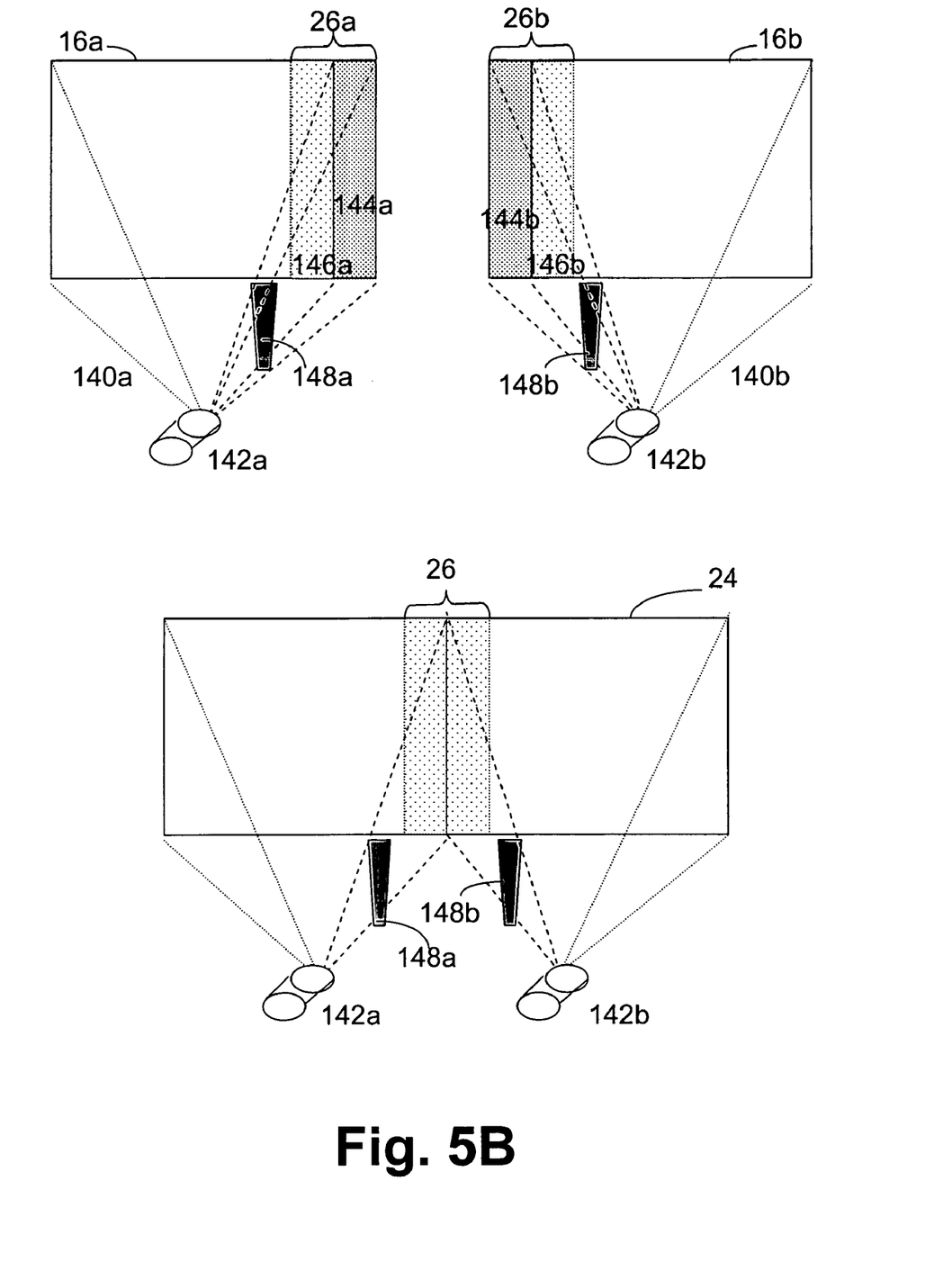
FIG. 5B is a schematic representation of the projection of two sub-images and the tiling of the two sub-images in a hard-edge mode of the second embodiment of the current invention.

The blending method and method of switching between hard edge and soft edge as described above is illustrated in FIG. 5A and FIG. 5B. FIG. 5A shows the system in blending mode, where optical attenuation is only active in the second half of the blending region. For clarity, the two sub-images 16a, 16b are first shown separately on top of FIG. 5A, while the soft-edge blended image 24 is shown at the bottom of FIG. 5A. The sub-images 16a, 16b are respectively formed by an image beam 140a, 140b generated by a projection device 142a, 142b. The blending area 26a, 26b of each sub-image 16a, 16b can be divided in two different regions, i.e. a first region 144a, 144b where optical soft edge means are active and a second region 146a, 146b where optical soft edge means inactive. As described above the first region 144a, 144b where optical attenuation is active has a width of maximum 50% of the blending area 26 and is situated at the outer edge of the sub-image 16a, 16b. The second region 146a, 146b in which electrical attenuation is performed, may be wider than the remaining region in the blending area 26a, 26b in which no optical attenuation is active, meaning that there may be a region in which both electrical attenuation and optical attenuation is active.

The optical attenuation is performed by putting an optical mask 148a, 148b in a part of the image beam 140a, 140b, more particularly in said part of the image beam responsible for forming the image in the first region 144a, 144b of the blending area 26a, 26b. The blended image 24 can be seen at the bottom of FIG. 5A.

In this soft edge blending mode, the image in the whole blending area 26 consists of the overlap of two sub-images 16a, 16b, wherein in the differing spatial regions electrical and optical attenuation means are used. In the hard-edge, non blending mode, shown in FIG. 5B, the electrical attenuation is set to a step function allowing 100% transmission of the part of image beam 140a, 140b responsible for the image in the first half of the blending area 26a, 26b, or thus in he second region 146a, 146b, and blocking the part of image beam 140a, 140b responsible of the image in the second half of the blending area 26a, 26b, or thus in the first region 144a, 144b. As the optical masks 148a, 148b only influence those parts of the image beams 140a, 140b responsible for the image in the second half of the blending area 26a, 26b, or thus in the first regions 144a, 144b, the optical masks 148a, 148b do not influence the merged image in the non-blending mode. Therefore it is not necessary to include mechanical attributes to remove the optical masks if the system is changed from blended to non-blended mode. This reduces the costs and the ease of fabrication of these systems.

Another embodiment of the present invention involves a blending method wherein the optical and electrical blending are combined in such a way that electrical blending causes attenuation of the light output from 100% transmission to 50% transmission across a first portion of the blending area 26a, 26b. In a second portion of the blending area 26a, 26b, the electrical transmission remains at 50% due to electrical filtering, while the optical attenuation varies from 100% transmission to 0% at the extreme edge of the blending area 26a, 26b.

Figure 6A:
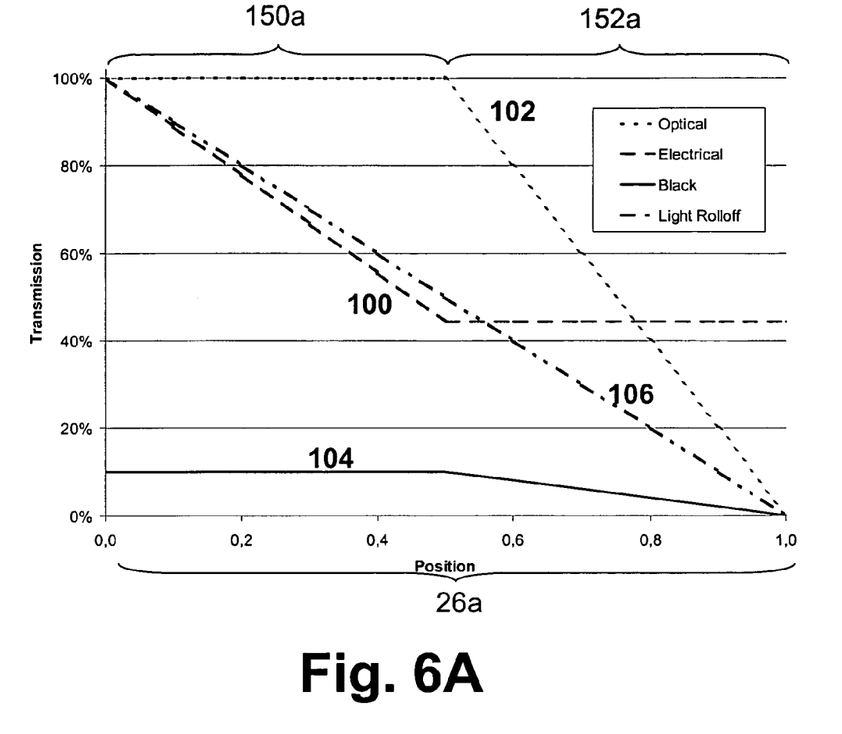
FIG. 6A shows an example of a graph of an optical attenuation curve, an electrical attenuation curve, a remaining black level intensity curve upon attenuation and a light roll-off upon attenuation curve versus the position in the blending area for a third embodiment of the current invention.

FIG. 6A shows an example of linear attenuation of light intensity according to the present embodiment. In the embodiment illustrated, the first and second portions each consist of half of the blending areas 26a, 26b. The graph of FIG. 6A shows the electrical attenuation curve 100 and the optical attenuation curve 102 as a function of the position in the blending area 26a, for a single sub-image 16a. The position scale again shows the position in the blending area 26a normalised to the range of 0 to 1. It is to be noted that, in the example illustrated, in the centre of the blending area 26a, the electrical attenuation of the light output drops to about 44%, i.e. less than 50%, in order to obtain an actual light output of 50% in the centre of the blending area 26a. In this way compensation is performed for the remaining black level intensity which is still present if only electrical attenuation is performed, in order to obtain a linear light roll-off curve. This compensation, illustrated for the present embodiment, can also be done for all embodiments according to the present invention.

The remaining black level curve 104 and the light roll-off curve 106 upon application of both electrical attenuation and optical attenuation are also shown in FIG. 6A. In the first portion 150a of the blending area where 26a only electrical blending is active (electrical attenuation curve 100). The black level stays at its constant value $I_{black\ level}$, as shown by black level curve 104. In the second portion 152a of the blending area 16a, the black level linearly drops to zero due to the optical blending applied there. The light roll-off curve

106 shows linear attenuation of the light output from its full intensity, i.e. 100%, to really black, i.e. 0% or no remaining light.

Figure 6B:
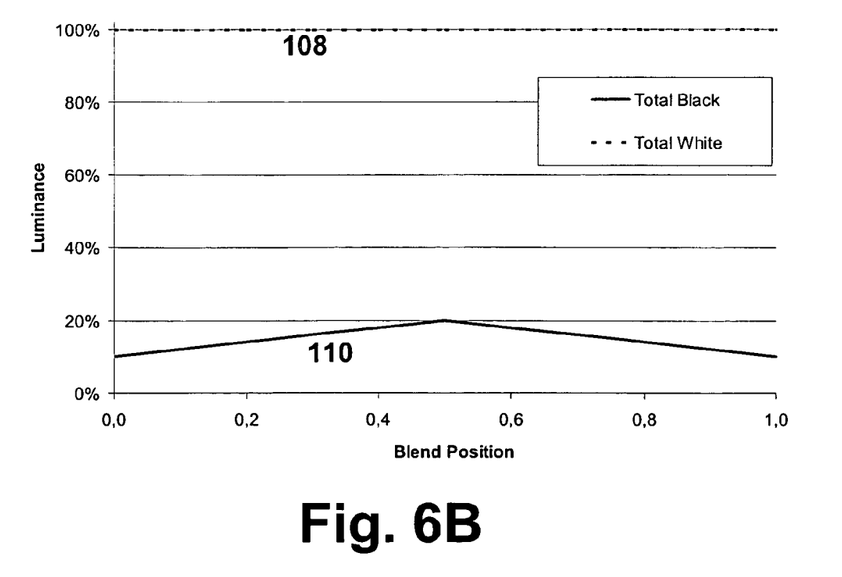
FIG. 6B shows an example of a graph of the total black level intensity and the total white level intensity in the blending area of two images versus the position in the blending area, using the optical and electrical attenuation curves as shown in FIG. 6A, according to the third embodiment of the invention.

FIG. 6B shows the result of the actual total light output (total light output curve 108) and the actual total black level (total black level curve 110) if the optical blending and electrical blending according to the current embodiment are used for blending two adjacent sub-images 16*a*, 16*b*, overlapping in a blending area 26. The black level intensity curve 104 and light roll-off curve 106 for the first sub-image 16*a* can then be seen in FIG. 6A, while the black level intensity and light roll-off curves for the second sub-image 16*b* are mirror-images (mirrored around a vertical axis) of the curves shown in FIG. 6A, if they would be shown on the same graph. The total white light output level curve 108 in the blending area 26, being the sum of the white level intensities of both sub-images 16*a*, 16*b* after attenuation, is shown in FIG. 6B. Furthermore, the total black level curve 110 in the blending area 26, being the sum of the remaining black level intensity of the two sub-images 16*a*, 16*b* after attenuation, is also shown. In this embodiment, the total black level does not have a region in which it stays near its maximum total black level intensity, but it gradually increases from its initial black level intensity of non-overlapping regions near the edge of the blending area 26 with the first non-overlapping area 28*a*, reaches its peak value ion the middle of the blending area 26 (for the embodiment illustrated, and depending on the exact widths of the first and second portions 150*a*, 152*a* of the blending areas 26*a*, 26*b*) and immediately starts decreasing to the black level intensity of non-overlapping area 28*b*.

Similar to the previous embodiment, the current embodiment has also the advantage that using only electrical controls allows to switch the system from soft edge blending to hard edge blending, as the optical attenuation of the image is restricted to the second portion of the blending area 26*a*, 26*b*.

Other possible embodiments of the present invention comprise blending methods wherein the regions of optical attenuation and electrical attenuation are switched. In other words, the optical attenuation occurs in the area adjacent to the non-overlapping region 28*a*, 28*b* of the sub-images 16*a*, 16*b*, whereas the electrical attenuation occurs in the area adjacent to the edge of the sub-images 16*a*, 16*b*.

Furthermore, according to the present invention, the region in which optical soft edge means are active or the region in which electrical soft edge means are active do not have to be joined. Consequently, different separated regions in which optical attenuation is active can be used and/or different separated regions in which electrical attenuation is active can be used. An example of this embodiment can be the use of active optical blending in a first region extending from the edge between the non-overlapping area 28*a*, 28*b* and the blending area 26*a*, 26*b* to e.g. 25% of the blending area width, active electrical blending in a second central region of the blending area, the second central region having a width of 50% of the blending area width, and again active optical blending in a third region with a width of 25% and adjacent to the edge of the sub-image 16*a*, 16*b*. The above example is only an illustration of this embodiment. Widths of the plurality of regions can be varied, and also the number of regions in the blending area can be varied.

Other embodiments, including further enhancements in the curve shapes, locations, and levels can be made to improve system operation. For example, it is well known in the industry that an 'S' shaped roll-off curve is desirable. Such a curve is easily reproduced using the method of combined optical and electronic blending as described herein in such a way that an 'S' curve exists for both the white and black level images.

A supplemental advantage of the embodiments according to the present invention, compared to systems using optical blending in the whole blending area, is the reduction of heating of the optical masks due to illumination. E.g. in the second and third embodiments, the light intensity has already been reduced down to 50% of its original value using electrical attenuation, before illumination of the optical mask. Consequently possible degradation of the optical components due to absorption of the illuminated light is limited and therefore, the lifetime of these optical components is increased.

The present invention also has the additional benefit of being able through simple electronic adjustment to correct brightness variations in the blending area 26 caused by slight errors in positioning of the projection devices, optical plates, plate manufacture, etc. Such freedom avoids time consuming mechanical adjustments and/or long iteration cycles in the manufacture of plates.

While the invention has been shown and described with reference to preferred embodiments, it will be understood that various changes or modifications in detail may be made without departing from the scope and spirit of this invention.

The invention claimed is:

1. A method for blending at least a first image with a first light intensity having a first intensity value and a second image with a second light intensity having a second intensity value, which first and second images overlap in a blending area, comprising     gradually changing the first light intensity by electronic soft edge means over a first fraction of the blending area, from the first intensity value to a first fraction of the first intensity value,     gradually changing the first light intensity by optical soft edge means over a second fraction of the blending area, from the first fraction of the first intensity value to a second fraction of the first intensity value,     the first fraction of the blending area being spatially different from the second fraction of the blending area and the first fraction together with the second fraction forming the blending area,     gradually changing the second light intensity by optical soft edge means over a third fraction of the blending area, from a first fraction of the second intensity value to a second fraction of the second intensity value,     gradually changing the second light intensity by electronic soft edge means over a fourth fraction of the blending area, from the second fraction of the second intensity value to the second intensity value,     the third fraction of the blending area being spatially different from the fourth fraction of the blending area and the third fraction together with the fourth fraction forming the blending area.

2. A method for blending according to claim 1, wherein said first fraction of the blending area and said second fraction of the blending area are spatially situated in the blending area so that they have no common part.

3. A method for blending according to claim 1, wherein the second fraction of the blending area is located adjacent to an edge of said first image and wherein the first fraction of the blending area is located adjacent to an edge of said second image.

4. A method for blending according to claim 1, wherein at least one of the first and second fraction of the blending area comprises two or more non-adjacent regions.

5. A method for blending according to claim 1, the first and second images being provided by projection devices, the method furthermore comprising making additional corrections for errors in positioning of the projection devices, for errors in positioning of the optical soft edge means and/or for errors in optical soft edge means manufacture.

6. A method for blending according to claim 1, wherein the first fraction of the blending area equals the third fraction and the second fraction equals the fourth fraction.

7. A method for blending according to claim 1, wherein the first, second, third and fourth fractions of the blending area each have a width between 1% and 99% of the width of the blending area, preferably between 20% and 80% of the width of the blending area, still more preferred between 40% and 60% of the width of the blending area.

8. A projection device for providing roll-off of light intensity of an image in an edge area, the image initially having a first light intensity having a first intensity value, comprising
electronic soft edge means for gradually changing the first light intensity over a first fraction of the edge area, from the first intensity value to a first fraction of the first intensity value, and
optical soft edge means for gradually changing the first light intensity over a second fraction of the edge area, from the first fraction of the first intensity value to a second fraction of the first intensity value,
the electronic soft edge means and the optical soft edge means being such that the first fraction of the edge area is spatially different from the second fraction of the edge area and that the first fraction together with the second fraction form the edge area.

9. A projection device according to claim 8, wherein said first fraction of the edge area and said second fraction of the edge area are spatially situated in the edge area so that they have no common part.

10. A projection device according to claim 8, wherein the second fraction of the edge area is located adjacent to an edge of said image.

11. A projection device according to claim 8, wherein at least one of to the first and second fraction of the edge area comprises two or more non-adjacent regions.

12. A projection device according to claim 8, furthermore comprising adjustment means for making additional corrections for errors in positioning of the projection device, for errors in positioning of the optical soft edge means and/or for errors in optical soft edge means manufacture.

13. A projection device according to claim 8, wherein the first and second fractions of the edge area each have a width between 1% and 99% of the width of the edge area, preferably between 20% and 80% of the width of the edge area, still more preferred between 40% and 60% of the width of the edge area.

* * * * *